(12) United States Patent
Arita et al.

(10) Patent No.: US 6,454,062 B1
(45) Date of Patent: Sep. 24, 2002

(54) DRUM BRAKE

(75) Inventors: Masatoshi Arita; Hisanori Yokokura, both of Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/076,601

(22) Filed: Feb. 19, 2002

(30) Foreign Application Priority Data

Feb. 19, 2001 (JP) .................................... 2001-041853

(51) Int. Cl.[7] ............................................... F16D 51/00
(52) U.S. Cl. .................... 188/325; 188/328; 188/341; 301/6.7
(58) Field of Search ............... 188/106 R, 74, 188/78, 18 R, 325, 328, 341, 340, 206 A, 218 R, 234, 250 A; 301/6.1, 6.6, 6.7

(56) References Cited

U.S. PATENT DOCUMENTS 4,219,923 A * 9/1980 Marti ...................... 188/18 R
5,269,396 A * 12/1993 Jones ...................... 188/234

FOREIGN PATENT DOCUMENTS

| JP | 10-148230 A | * | 6/1998 |
| JP | 11-201203 | | 7/1999 |

* cited by examiner

*Primary Examiner*—Pam Rodriguez
(74) *Attorney, Agent, or Firm*—Morgan, Lewis & Bockius LLP

(57) ABSTRACT

A mount bracket attached to a vehicle body is formed by pressing a metal plate to constitute a structure substantially in a shape of a flat plate having a circular plate portion overlapping a circular disc portion of a backing plate and a flange portion extended from an outer periphery of the circular plate portion as a portion attached to the vehicle body. A pair of brake shoes, a shoe drive mechanism and an anchor pin are constituted to be directly attached to the circular plate portion of the mount bracket without interposing the backing plate.

2 Claims, 5 Drawing Sheets

DRUM BRAKE

BACKGROUND OF THE INVENTION

1. Field of the Invention

The present invention relates to a drum brake preferable for an industrial vehicle such as a fork lift truck. Specifically, the present invention relates to an improvement in achieving a light-weighted structure for reducing production cost and achieving promotion of maintenance performance.

2. Description of the Related Art

FIG. 5 and FIG. 6 show a conventional example of a drum brake for braking a front wheel of a fork lift truck.

The drum brake 1 is disclosed in JP-A-11-201203 and is constituted by providing a drum 5 formed in a headed cylindrical shape and integrally rotated with a front wheel tire 3; a pair of brake shoes 7 and 8 arranged to be opposed to each other at the inside of the drum 5; a shoe drive mechanism 9 for expanding the brake shoes 7 and 8 toward an inner peripheral face of the drum 5; an anchor pin 11 applied with brake torque by being brought into contact with end portions of the brake shoes 7 and 8; a backing plate 13 having a circular disc portion 13a on which side edges 7a and 8a of the respective brake shoes 7 and 8 slidingly move and a cover portion 13b extended from an outer periphery of the circular disc portion 13a in an axial direction for covering an outer peripheral portion of the drum 5; and a mount bracket 15 having a portion thereof attached with the backing plate 13 and fixed to a vehicle body.

As shown in FIG. 5, the mount bracket 15 is integrally formed with a first flange portion 15a fastened to a frame 17 on the vehicle side by a screw 19; a second flange portion 15c formed with a shaft inserting hole 15b inserted with a drive shaft 21 of the front wheel tire 3 at its center; and a sleeve 15d formed in a cylindrical shape concentric with the shaft inserting hole 15b. The mount bracket 15 is formed by casting or the like.

The illustrated shoe drive mechanism 9 is a wheel cylinder 9a arranged between opposed ends of the pair of brake shoes 7 and 8 on one side and operated by hydraulic pressure. The pair of brake shoes are expanded by urging the end portions of the pair of brake shoes in directions separating from each other.

The wheel cylinder 9a is fixed to the circular disc portion 13a of the backing plate 13.

The pair of brake shoes 7 and 8 are supported by the circular disc portion 13a of the backing plate 13 operable to expand by shoe hold-down pins, not illustrated.

As shown in FIG. 6, the backing plate 13, attached with the pair of brake shoes 7 and 8 and the shoe drive mechanism 9, is fixed to the second flange portion 15c of the mount bracket 15 via a stud bolt 23.

The cover portion 13b of the backing plate 13 functions as a dust cover for preventing foreign matter from invading from the outside into the drum 5.

The anchor pin 11 is fixedly fastened by a screw member 25 in a state of being inserted to both of the circular disc portion 13a of the backing plate 13 and the second flange portion 15c of the mount bracket 15.

In the case of the above-described conventional drum brake 1, the backing plate 13 is formed by pressing. On the other hand, since the mount bracket 15 is constructed by a three-dimensional structure in which the sleeve 15d is projected relative to the first flange portion 15a and the second flange portion 15c, casting or forging is needed as a method of producing the mount bracket 15. Therefore, there poses a problem that production cost is increased highly since there are needed not only a pressing facility but also a facility for precision casting or the like in a production line. Furthermore, according to the mount bracket 15 produced in this way, its weight is increased.

Moreover, the circular disc portion 13a of the backing plate 13, on which the side edges 7a and 8a of the brake shoes 7 and 8 slidingly move in braking, is worn by repeating braking operation and needs to be replaced. However, according to the above-described conventional drum brake 1, the backing plate 13 is attached with the brake shoes 7 and 8, the shoe drive mechanism 9 and the anchor pin 11; therefore, when the backing plate 13 is replaced due to wear thereof, an article to be replaced is obliged to reassemble again after temporarily removing all of attached parts. This poses a problem that maintenance performance is poor in replacing the backing plate or the like.

SUMMARY OF THE INVENTION

The present invention has been carried out in view of the above-described situation and it is an object thereof to provide a drum brake capable of forming a mount bracket by pressing and capable of reducing production cost by omitting a facility for precision casting or the like in a production line. At the same time, it is an object of the present invention to provide a drum brake capable of achieving a light-weighted structure of a product, further, excellent in maintenance performance by dispensing with removal or reattachment of a brake shoe, a shoe drive mechanism and the like when a backing plate is replaced in accordance with wear of a sliding portion thereof.

In order to achieve the above-described object, according to the invention, there is provided a drum brake comprising: a pair of brake shoes arranged opposedly to each other in a drum; a shoe drive mechanism for expanding the brake shoes toward an inner peripheral face of the drum; an anchor pin applied with a brake torque by being brought into contact with end portions of the brake shoes in braking; a backing plate having a circular disc portion on which side edges of the respective brake shoes slidingly move and a cover portion extended from an outer periphery of the circular disc portion in an axial direction for covering an outer peripheral portion of the drum; and a mount bracket having a portion for attaching the backing plate and fixed to a vehicle body, wherein the mount bracket is constructed by a structure substantially in a shape of a flat plate having a circular plate portion overlapping the circular disc portion of the backing plate and a flange portion extended from an outer periphery of the circular plate portion to constitute a portion for attaching the vehicle body, and wherein the pair of brake shoes, the shoe drive mechanism and the anchor pin are directly attached to the circular plate portion of the mount bracket without interposing the backing plate.

Further, according to the above-described constitution, the mount bracket is constructed by the structure substantially in the shape of the flat plate which is a simple two-dimensional structure; therefore, the mount bracket can be formed by pressing similar to the backing plate or the like.

Further, there is constructed a constitution in which the pair of brake shoes, the shoe drive mechanism and the anchor pin are directly attached to the circular plate portion of the mount bracket without interposing the backing plate; therefore, when the backing plate is replaced in accordance with wear of a sliding portion (edge face) thereof, it is not necessary to remove or reattach the brake shoes, the shoe drive mechanism or the like. That is, only the backing plate may be removed by itself, and a part to be replaced may newly be attached thereto.

Further, according to the present invention, the drum brake may be characterized in that the mount bracket is formed by pressing a metal plate.

Further, by constructing the above-described constitution, in comparison with the conventional cast product or forged product, a considerable light-weighted structure can be realized.

DETAILED DESCRIPTION OF THE PREFERRED EMBODIMENT

Hereinafter, a preferred embodiment of a drum brake according to the present invention is described in detail with reference to the drawings.

Figure 1:
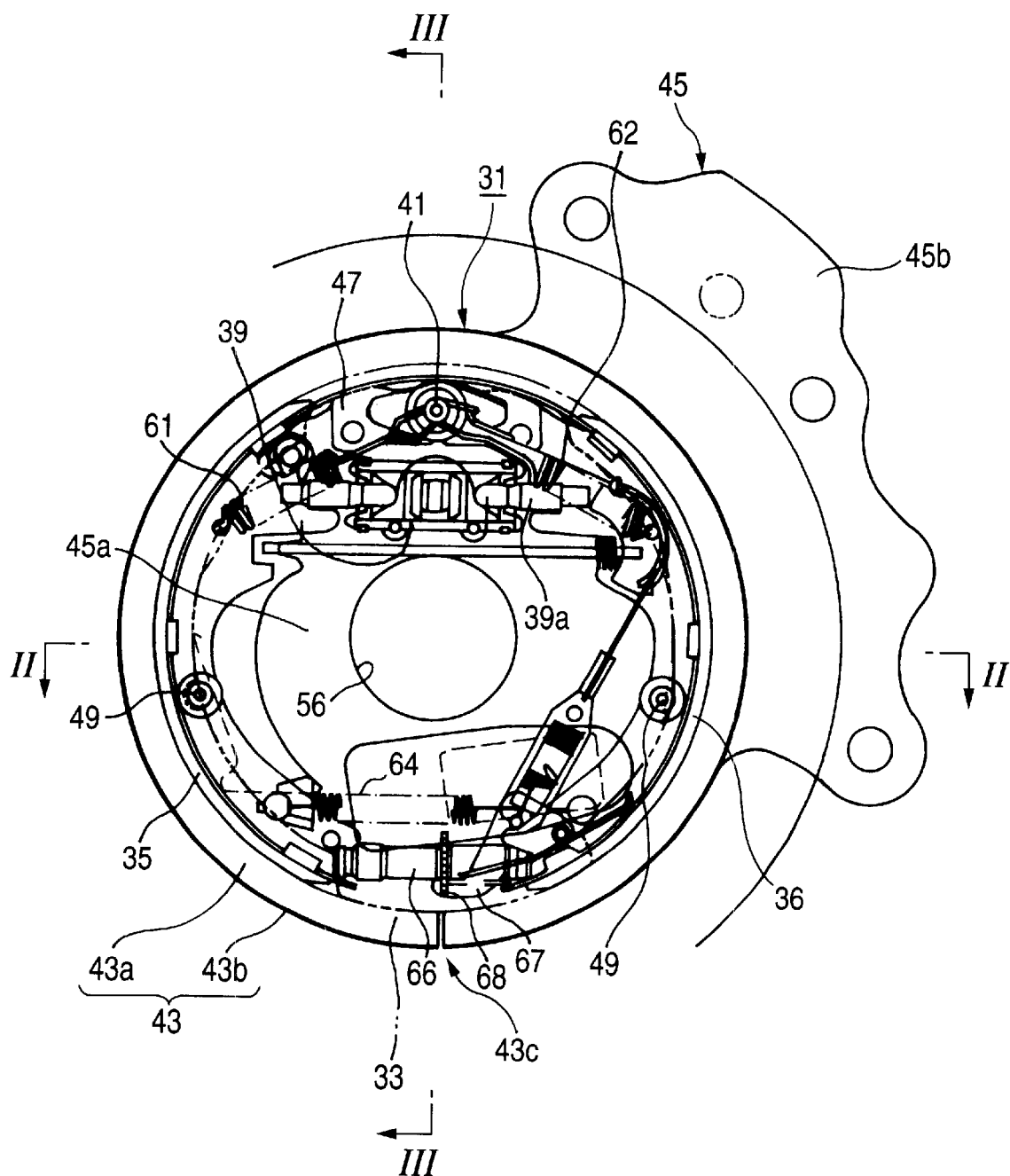
FIG. 1 is a front view of an embodiment of a drum brake according to the present invention.
Figure 2:
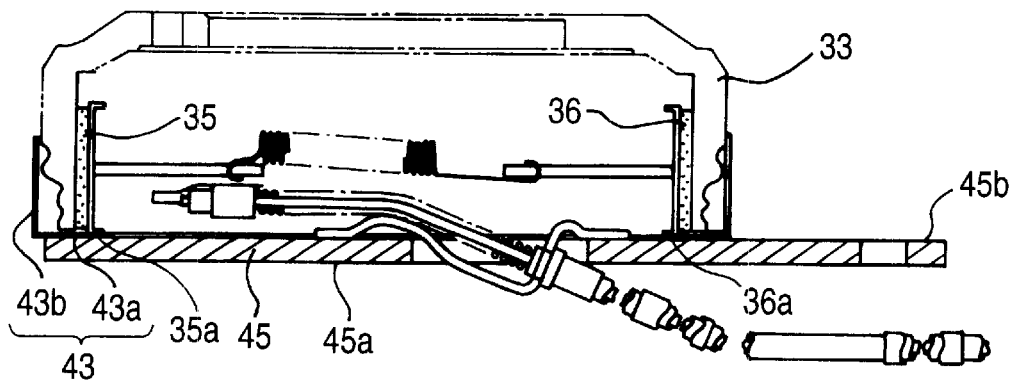
FIG. 2 is a sectional view taken along line II—II of the drum brake shown in FIG. 1.
Figure 3:
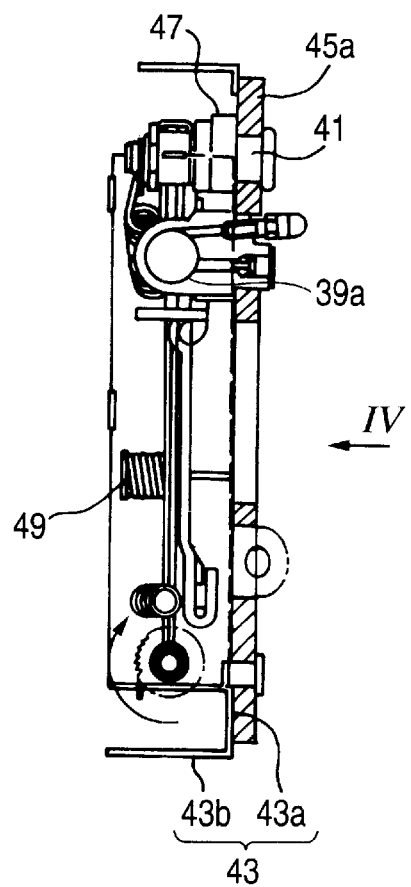
FIG. 3 is a sectional view taken along line III—III of the drum brake shown in FIG. 1.
Figure 4:
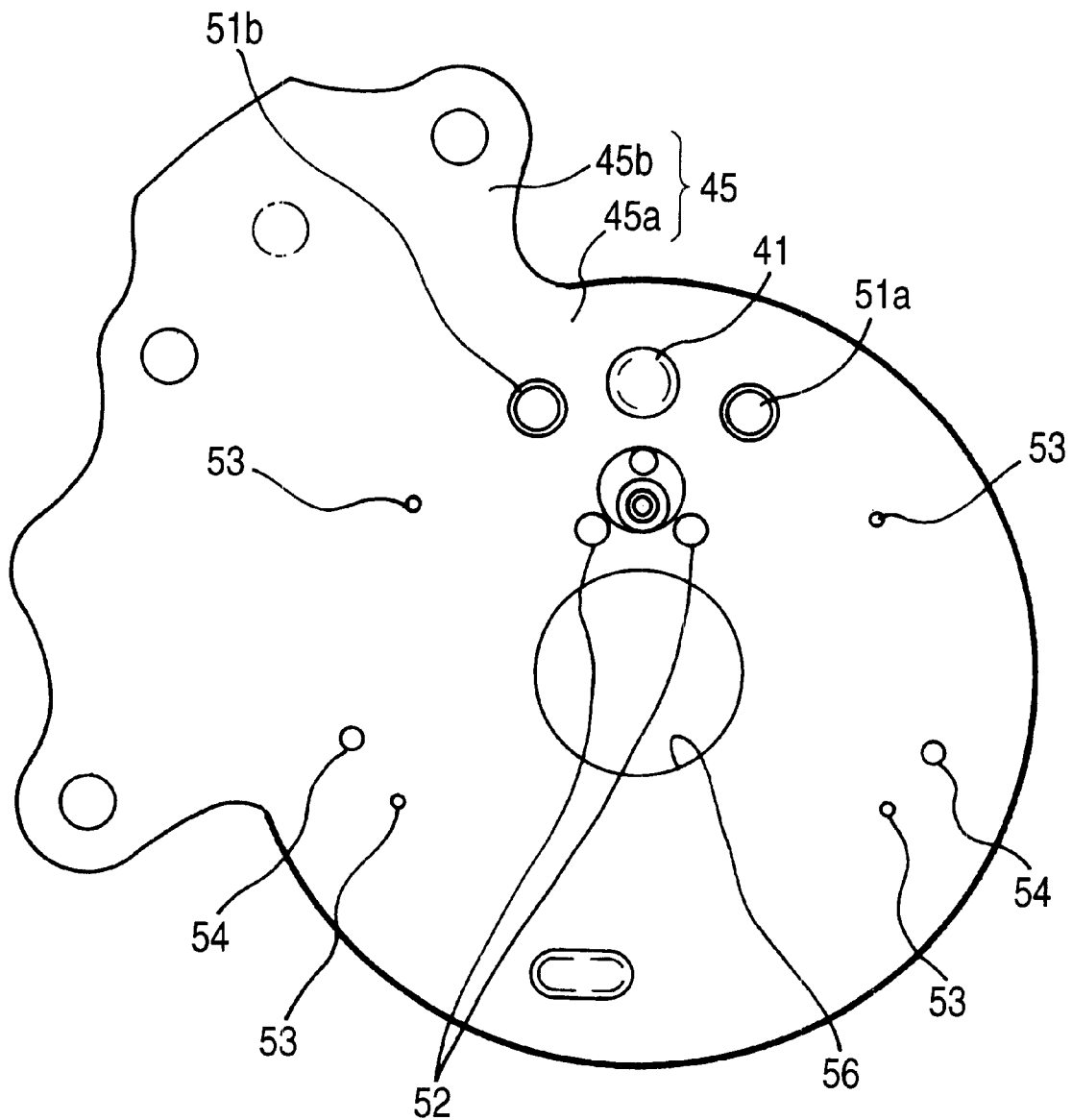
FIG. 4 is a view of FIG. 3 taken in a direction of arrow mark IV and showing a mount bracket of the embodiment.
Figure 5:
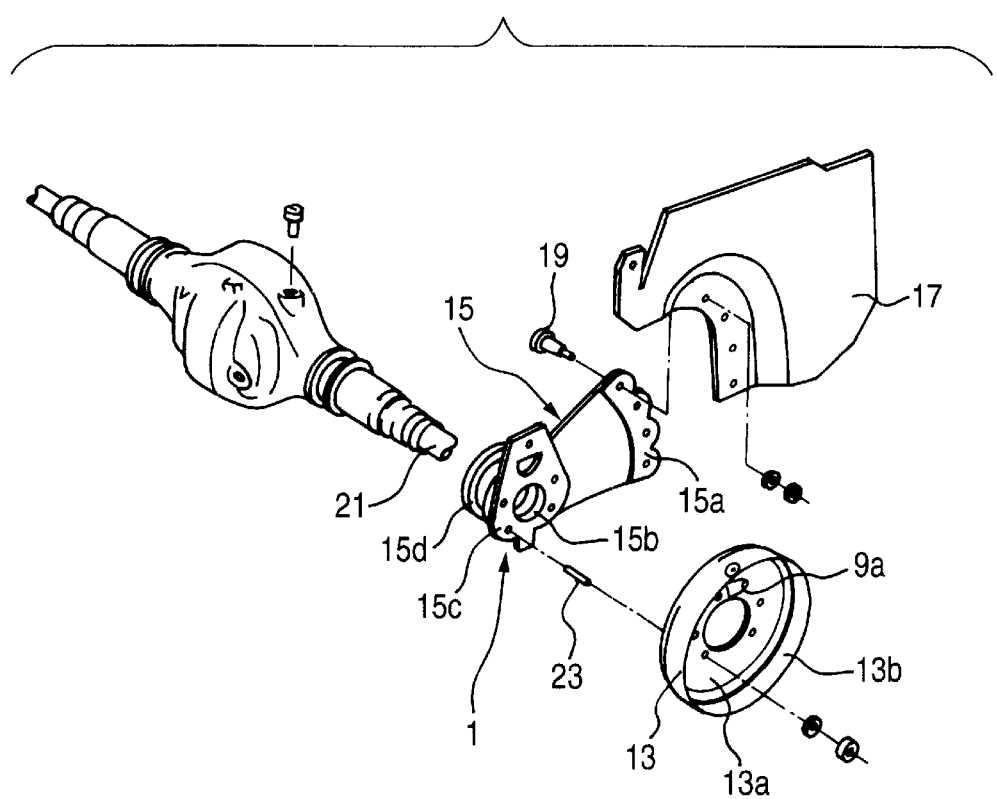
FIG. 5 is a disassembled perspective view of a conventional drum brake.
Figure 6:
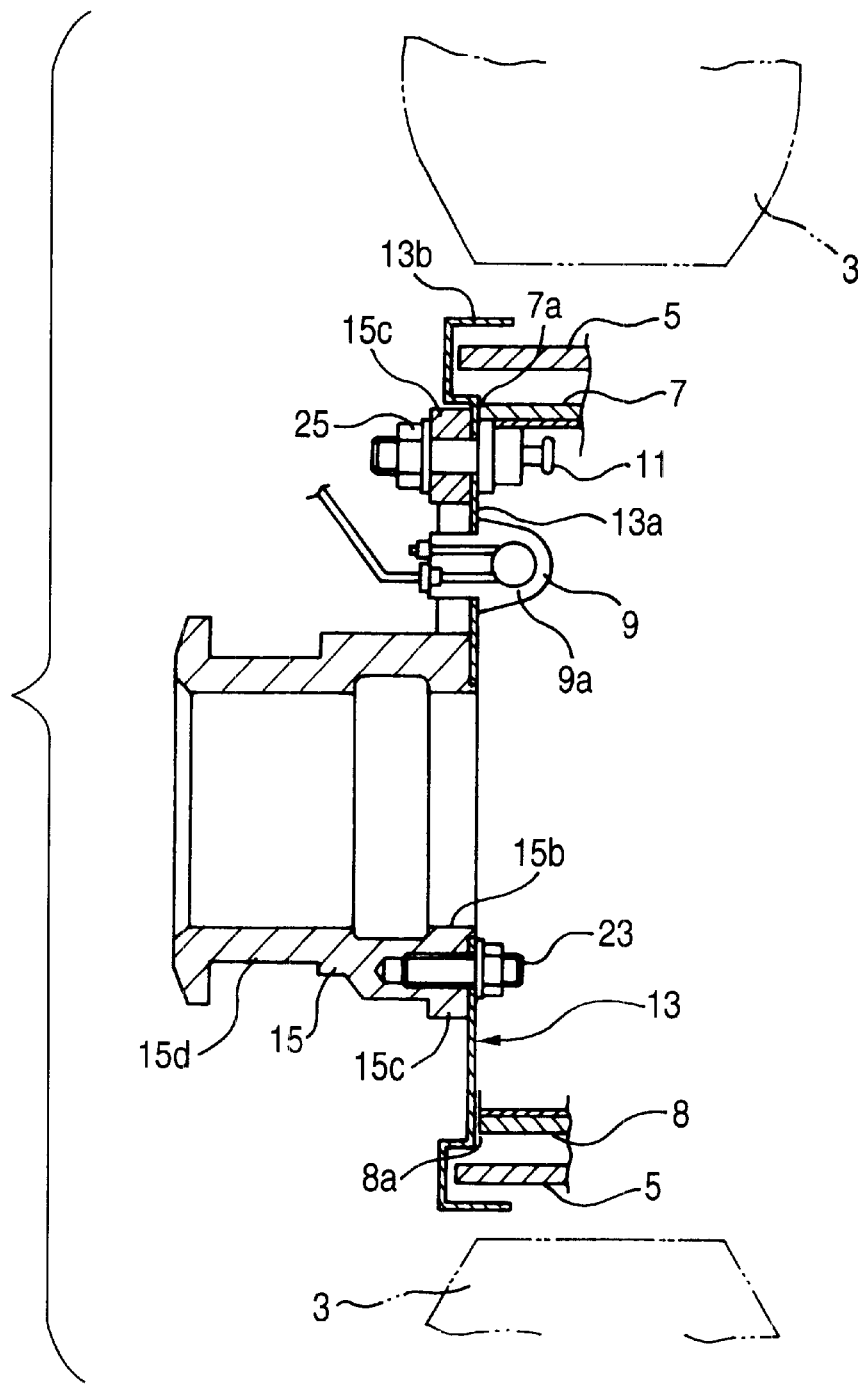
FIG. 6 is a vertical sectional view of the conventional drum brake shown in FIG. 5.

FIG. 1 through FIG. 4 show an embodiment of a drum brake according to the present invention. FIG. 1 is a front view of an embodiment of a drum brake according to the present invention. FIG. 2 is a sectional view taken along line II—II of the drum brake shown in FIG. 1. FIG. 3 is a sectional view taken along line III—III of the drum brake shown in FIG. 1. FIG. 4 is a view of FIG. 3 taken in a direction of arrow mark IV and showing a mount bracket of the embodiment.

The drum brake 31 is a drum brake of a duo-servo type for braking a front wheel of a fork lift truck and is provided with a drum 33 formed in a headed cylindrical shape and integrally rotated with a front wheel tire, not illustrated; a pair of brake shoes 35 and 36 arranged opposedly to each other at the inside of the drum 33; a shoe drive mechanism 39 for expanding the brake shoes 35 and 36 toward an inner peripheral face of the drum 33; an anchor pin 41 applied with brake torque by being brought into contact with end portions of the brake shoes 35 and 36 in braking; a backing plate 43 having a circular disc portion 43a, on which side edges 35a and 36a of the respective brake shoes 35 and 36 slidingly move, and a cover portion 43b extended from an outer periphery of the circular disc portion 43a in an axial direction for covering an outer peripheral portion of the drum 33; and a mount bracket 45 having a portion for attaching the backing plate 43 and fixed to a vehicle body.

As shown in FIG. 4, the mount bracket 45 is constructed by a structure substantially in a shape of a flat plate having a circular plate portion 45a overlapping the circular disc portion 43a of the backing plate 43 and a flange portion 45b extended in an outer direction from an outer periphery of the circular plate portion 45a along the circular plate portion 45a. The flange portion 45b constitutes a portion attached to the vehicle body.

As shown in FIG. 4, the circular plate portion 45a of the mount bracket 45 is provided with anchor attaching holes 51a and 51b for fixedly positioning the anchor pin 41 and an anchor block 47; a drive mechanism attaching hole 52 for fixedly positioning a hydraulic type wheel cylinder 39a constituting the shoe drive mechanism 39; a plate attaching hole 53 for fixedly positioning the circular disc portion 43a of the backing plate 43 by screw-fastening; and a pin attaching hole 54 for supporting a shoe hold-down pin 49 for displaceably supporting the pair of brake shoes 35 and 36 toward an inner periphery of the drum 33. Further, a central portion of the circular plate portion 45a is provided with a shaft inserting hole 56 for inserting a drive shaft of a front wheel, not illustrated.

Different from the conventional structure, each of the pair of brake shoes 35 and 36, the shoe drive mechanism 39 and the anchor pin 41 are directly attached to the respective attaching holes on the circular plate portion 45a of the mount bracket 45 without interposing the backing plate 43.

That is, the circular disc portion 43a of the backing plate 43 is formed in a ring-like shape cutting off a central portion thereof by a large amount to escape positions of attaching the pair of brake shoes 35 and 36, the shoe drive mechanism 39, the anchor pin 41 and the anchor block 47. Further, the circular disc portion 43a has a slitting portion 43c at a lower portion thereof.

According to the above-described drum brake 31, the brake shoes 35 and 36, the shoe drive mechanism 39, the anchor pin 41, the anchor block 47 and the like are directly attached to the mount bracket 45. Therefore, according to the embodiment, the backing plate 43 attached with the constituent parts inherently functions as a dust cover for preventing foreign matter from invading into the drum 33 by the cover portion 43b.

Further, the backing plate 43 is formed by pressing a metal plate.

Further as a supplementary explanation of a general structure of the duo-servo type drum brake, the pair of brake shoes 35 and 36 arranged oppositely to each other are urged at both ends thereof on one side in a direction of approaching each other. Further, both ends of the pair of brake shoes 35 and 36 on either side are urged to a state of being brought into contact with an adjuster unit 66 by a shoe-to-shoe-spring 64.

The adjuster unit 66 is extended by driving to rotate an adjusting gear 68 with pivotal movement of an adjuster lever 67 in cooperation with expanding operation of the brake shoes 35 and 36 to thereby maintain constant clearances between the respective brake shoes 35 and 36 and the drum 33.

In the case of the above-described drum brake 31, the mount bracket 45 is constructed by the structure substantially in the shape of the flat plate and can be formed by pressing similar to the backing plate 43 owing to the simple two-dimensional structure. Accordingly, in comparison with the case of the conventional mount bracket 15 constructed by the three-dimensional structure for mounting the sleeve, production cost can be reduced by omitting a facility for precision casting or the like in a production line and at the same time, a considerable reduction in weight is achieved.

Further, since there is constructed the construction in which the pair of brake shoes 35 and 36, the shoe drive mechanism 39, the anchor pin 41 and the like are directly attached to the circular plate portion 45a of the mount bracket 45 without interposing the backing plate 43, when the backing plate 43 is replaced in accordance with wear of the sliding portion, it is not necessary to remove or reattach the brake shoes 35 and 36, the shoe drive mechanism 39 and the like. That is, the backing plate 43 can be removed by itself by expanding only the screw-fastened backing plate 43 to the left side and to the right side at a portion of the slitting portion 43c by utilizing elastic deformation, and a new part to be replaced may be attached. Therefore, operation of replacing the backing plate 43 is simplified, and excellent maintenance performance can be achieved.

Further, the present invention can naturally be utilized not only for a fork lift truck but also as a drum brake for a general vehicle.

As described above, according to the drum brake of the present invention, the mount bracket is constructed by the structure substantially in the shape of the flat plate, which is the simple two-dimensional structure; therefore, the mount bracket can be formed by pressing. In comparison with the case of the conventional mount bracket constructed by the three-dimensional structure for mounting the sleeve, production cost can be reduced by omitting a facility for precision casting or the like in a production line and at the same time, a light-weighted structure thereof can be achieved in comparison with a conventional cast product or forged product.

Further, owing to the constitution in which the pair of brake shoes, the shoe drive mechanism and the anchor pin are directly attached to the circular plate portion of the mount bracket without interposing the backing plate, when the backing plate is replaced in accordance with wear of the sliding portion, it is not necessary to remove or reattach the brake shoes, the shoe drive mechanism and the like. That is, only the backing plate may be removed by itself, and a new part to be replaced may be attached. Accordingly, operation of replacing the backing plate is simplified, and excellent maintenance performance can be achieved.

What is claimed is:

1. A drum brake comprising:

a drum;

a pair of brake shoes arranged opposedly to each other in said drum;

a shoe drive mechanism for expanding said brake shoes toward an inner peripheral face of said drum;

an anchor pin applied with a brake torque by being brought into contact with end portions of said brake shoes in braking;

a backing plate including a circular disc portion, on which a side edge of each of said brake shoes slidingly moves, and a cover portion extended from an outer periphery of said circular disc portion in an axial direction for covering an outer peripheral portion of said drum; and a mount bracket for attaching said backing plate, said mount bracket formed in a shape of a substantially flat plate and including a circular plate portion overlapping said circular disc portion of said backing plate and a flange portion extended from an outer periphery of said circular plate portion for being attached to a vehicle body, wherein said brake shoes, said shoe drive mechanism and said anchor pin are directly attached to said circular plate portion of said mount bracket without interposing said backing plate.

2. The drum brake according to claim 1, wherein said mount bracket is formed by pressing a metal plate.

* * * * *